No. 800,760. PATENTED OCT. 3, 1905.
F. D. OGDEN.
TOGGLE NUT.
APPLICATION FILED MAY 20, 1905.
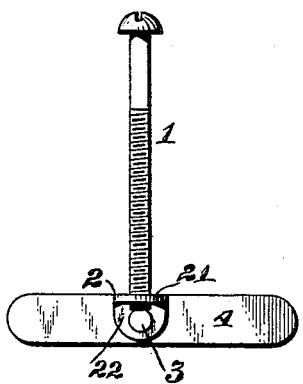
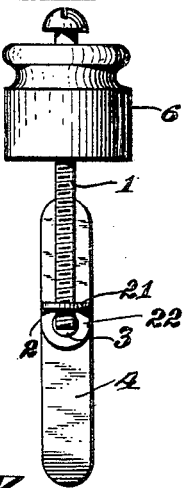
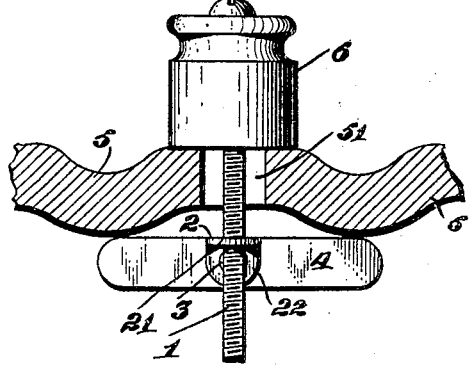
Attest:
E. O. Mitchell
A. L. O'Brien
Inventor:
FREDRIC D. OGDEN
by Dickerson, Brown, Raegener & Binney
Attys.

UNITED STATES PATENT OFFICE.

FREDRIC D. OGDEN, OF NEW YORK, N. Y.

TOGGLE-NUT.

No. 800,760.      Specification of Letters Patent.      Patented Oct. 3, 1905.

Application filed May 20, 1905. Serial No. 261,377.

*To all whom it may concern:*

Be it known that I, FREDRIC D. OGDEN, a citizen of the United States, and a resident of the borough of Manhattan, city, county, and State of New York, have invented certain new and useful Improvements in Toggle-Nuts, of which the following is a specification.

My invention relates to toggle-nuts such as are used on bolts or screws, particularly where these are required to be inserted in an aperture in a wall or the like. It provides a cheap and strong nut which may be easily inserted in place and which will afford an efficient engagement with the bolt.

In the drawings, Figure 1 represents a toggle-nut embodying my invention with a bolt engaged therein. Fig. 2 shows the bolt and nut as the same is ready to be placed in operative position. Fig. 3 shows a bolt and nut operative to secure an insulator to a wall or the like.

1 designates a bolt, which may be of any desired form, the threaded end of which is engaged with a body 21 of a nut 2. Shown as forming part of the body 21 is a flange 22, approximately at a right angle with the body and pivotally secured, by means of a rivet 3, to a flat sheet-metal plate 4, the arms of which extend to a nearly equal distance from the rivet 3. One arm is made a little longer or a little heavier than the other, so that when freely supported on the rivet 3 the bar 4 will drop into the position shown in Fig. 2. It is then ready to be passed into an aperture 51 in a wall 5 and on being moved slightly may be drawn up, so that its arms engage with the inner side of the wall, when the bolt 1 may be screwed home and firmly held in position. I have shown the bolt as securing an insulator 6 to the wall 5; but it is of course obvious that the bolt or screw may be used for any desired purpose.

The nut 2 is preferably formed from sheet metal, with its body portion 21 and flange 22 integral, and the flat sheet-metal bar 4 is pivoted to the outer side thereof, so as not to interfere with the movement of the bolt 1 through the nut-body 21. It will also be seen that the pivotal bar or plate 4 is advantageous in that it permits a direct engagement of the bolt in the aperture 51 even though the inner side of the wall 5, against which the plate bears, is irregular or uneven.

Without specifying materials or enumerating equivalents, what I claim is—

1. A toggle-nut comprising a threaded nut proper having a body and a flange extending at approximately a right angle with said body, and a bar the length of which is greater than the width of said nut pivoted on said flange.

2. A toggle-nut comprising a nut proper formed from sheet metal having a threaded body and a flange at approximately a right angle with said body, and a flat metal bar pivoted to the outer side of said flange and in a plane parallel therewith.

In testimony whereof I have signed this specification in the presence of two subscribing witnesses.

FREDRIC D. OGDEN.

Witnesses:
    HENRY G. LAMB,
    JOS. KENNEDY.